United States Patent
Zhang

(10) Patent No.: US 11,307,441 B2
(45) Date of Patent: Apr. 19, 2022

(54) MANUFACTURING FOR DISPLAY PANEL

(71) Applicants: HKC Corporation Limited, Shenzhen (CN); Chongqing HKC Optoelectronics Technology Co., ltd., Chongqing (CN)

(72) Inventor: Wei Zhang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 644 days.

(21) Appl. No.: 16/331,981

(22) PCT Filed: Jan. 9, 2018

(86) PCT No.: PCT/CN2018/071855
§ 371 (c)(1),
(2) Date: Mar. 11, 2019

(87) PCT Pub. No.: WO2019/134178
PCT Pub. Date: Jul. 11, 2019

(65) Prior Publication Data
US 2021/0364829 A1 Nov. 25, 2021

(30) Foreign Application Priority Data

Jan. 3, 2018 (CN) .......................... 201810003695.7

(51) Int. Cl.
*G02F 1/13* (2006.01)
*B65G 47/91* (2006.01)
*G09F 9/37* (2006.01)
*H01L 51/56* (2006.01)

(52) U.S. Cl.
CPC ............ *G02F 1/1303* (2013.01); *B65G 47/91* (2013.01); *G09F 9/377* (2013.01); *H01L 51/56* (2013.01)

(58) Field of Classification Search
CPC ....... G02F 1/1303; B65G 47/91; G09F 9/377; H01L 51/56
See application file for complete search history.

(56) References Cited

U.S. PATENT DOCUMENTS

| | | | | |
|---|---|---|---|---|
| 2016/0288403 | A1* | 10/2016 | Schumaker | G03F 7/0002 |
| 2020/0284511 | A1* | 9/2020 | Zhang | F26B 21/003 |
| 2021/0333576 | A1* | 10/2021 | Yao | G02F 1/133788 |
| 2021/0335901 | A1* | 10/2021 | Hu | H01L 51/56 |
| 2021/0382356 | A1* | 12/2021 | Zhan | G02F 1/133514 |

* cited by examiner

*Primary Examiner* — Tracie Y Green

(57) ABSTRACT

The present application discloses a manufacturing device for a display panel. The manufacturing device for the display panel includes a base; at least one transfer mechanism, fixedly disposed on the base; and at least one detecting mechanism, fixedly disposed, on the base; a control mechanism is disposed in the base, the control mechanism controls the transfer mechanism and the detecting mechanism, and a set height of the detecting mechanism is smaller than that of the transfer mechanism.

20 Claims, 3 Drawing Sheets

MANUFACTURING FOR DISPLAY PANEL

TECHNICAL FIELD

The present application relates to the technical field of display, and in particular, to a manufacturing device for a display panel.

BACKGROUND

Displays are generally controlled based on active switches and have many advantages such as thin bodies, power saving and no radiation. The displays have been widely used and mainly include liquid crystal displays, organic light-emitting diode (OLED) displays, quantum dot light-emitting diode (QLED) displays, plasma displays, etc. There are flat displays and curved displays according to the appearance and structure.

The liquid crystal display includes a liquid crystal panel and a backlight module. The working principle of the liquid crystal display is to place liquid crystal molecules between two parallel glass substrates and apply a driving voltage to the two glass substrates to control a rotary direction of the liquid crystal molecules, so that the light of the backlight module is refracted to generate a picture.

The OLED display adopts organic light-emitting diodes to emit light for display, and has the advantages such as self-light emitting, a wide viewing angle, an almost infinitely high contrast, low power consumption, and an extremely high reaction speed.

The structure of the QLED display is very similar to that of the OLED technology. The main difference is that the light-emitting center of the QLED is composed of the substance of quantum dots. Its structure is that the electrons and holes in both sides converge in a quantum dot layer to form photons (exciton), and light emission is realized by photon recombination.

The manufacturing device for a display panel cannot be used to effectively judge whether a transferred object is bonded to the substrate during the transfer process, which easily causes the substrate to drop and break during the transfer process.

SUMMARY

An objective of the present application is to provide a manufacturing device for a display panel, which effectively detects whether the bonding occurs in a manufacturing process of the display panel.

It order to solve the above problem, the manufacturing device for a display panel provided by an embodiment of the present application includes:

a base;

at least one transfer mechanism, fixedly disposed on the base; and at least one detecting mechanism, fixedly disposed on the base;

a control mechanism is disposed in the base, the control mechanism controls the transfer mechanism and the detecting mechanism, where a set height of the detecting mechanism is smaller than that of the transfer mechanism.

The transfer mechanism includes a support rod, one end of the support rod is fixedly connected to the base, and the other end of the support rod is provided with a suction cup. In this way, by the arrangement of the support rod, manufactured components can be effectively transferred in the manufacturing process of the display panel, and the manufacturing of the display panel can be better finished. The components of the display panel which need to be transferred can be effectively sucked by the suction cup. The suction cup is made of a flexible material, thus the suction cup can be better attached to the components of the display panel which need to be transferred, and the air in the suction cup can be effectively removed. Therefore, a greater action force can be obtained, and the components of the display panel which need to be transferred can be effectively prevented from dropping and breaking in the transfer process.

The support rod is provided with a passage therein, one end of the passage provided with the suction cup is provided with a switch, the control mechanism controls the ON or OFF of the switch, and the suction cup is in communication with the passage during OFF. In this way, the On and OFF of the switch are controlled by the control mechanism, the switch is OFF when the suction cup needs to be vacuumized, such that air is pumped from the passage, and the suction cup obtains a larger suction force, thereby effectively preventing the components of the display panel from dropping and breaking in the transfer process. The switch is controlled to be ON after the air in the suction cup is completely pumped, and a vacuum state in the suction cup is ensured.

The detecting mechanism includes a detecting component. the detecting component includes a shielding cover, and a sensing electrode is disposed in the shielding cover. In this way, due to the arrangement of the shielding cover, the interference of electromagnetism on the detecting component can be effectively avoided, such that the detection efficiency of the detecting component is further improved, and the precision of the detecting component is effectively improved.

The manufacturing device includes a processor, the processor is coupled to the detecting component, the processor includes an oscillating circuit, a frequency voltage converter, a signal processing circuit, and an on-off output circuit, and the oscillating circuit, the frequency voltage converter, signal processing circuit, and on-off output circuit are coupled to each other. In this way, when approaching an effective surface of the sensor, an object enters an electric field in front of the surface of the detecting component and causes the coupling capacitance to be changed. A oscillator in the oscillating circuit begins to oscillate, the amplitude of oscillation is converted into a voltage model by the frequency voltage converter, and the voltage model is processed by the signal processing circuit and the on off output circuit to output a switch command.

The manufacturing device includes a display device, and the display device is coupled to the on off output circuit. In this way, the display device is configured to display the switch command output by the on-off output circuit, and the display device is optionally a display screen, a sound signal output circuit, a light signal output circuit, etc.

The sound signal output circuit outputs a sound signal and the light signal output circuit outputs a light signal.

The detecting mechanism includes a sensor, and the sensor includes a color difference sensor. In this way, the color difference sensor is used in the use process to distinguish a spacer plate and a substrate, and the bonding phenomenon occurring in the manufacturing process of the display panel is comprehensively judged and detected in cooperation with the sensors of other forms.

The detecting mechanism includes a proximity switch, and the proximity switch is a capacitive proximity switch. In this way, the capacitive proximity switch is a position sensor having on-off output. A measuring head is a polar plate forming a capacitor, while the other polar plate is the object itself. When the object approaches the proximity switch, the dielectric constants of the object and the proximity switch change, so that the state of the circuit connected to the measuring head also changes accordingly, and thereby controlling the ON/OFF of the proximity switch.

The control mechanism includes a control chip, and the control chip is coupled to the detecting mechanism and the transfer mechanism. In this way, the control chin can effectively control the detecting mechanism and the transfer mechanism to ensure stable and orderly operation of the manufacturing device, thereby effectively improving the working efficiency of the manufacturing device, and effectively improving the manufacturing efficiency of the display panel.

According to another aspect of the present application, the present application also discloses a manufacturing device for a display panel. The manufacturing device for a display panel includes:

a base;

at least one transfer mechanism, fixedly disposed on the base; and at least one detecting mechanism, fixedly disposed on the base;

a control mechanism is disposed in the base, and the control mechanism controls the transfer mechanism and the detecting mechanism, wherein a set height of the detecting mechanism is smaller than that of the transfer mechanism the transfer mechanism includes a support rod, where one end of the support rod is fixedly connected to the base, and the other end of the support rod is provided with a suction cup; the support rod is provided with a passage therein, one end of the passage provided with the suction cup is provided with a switch, the control mechanism controls the ON or OFF of the switch, and the suction cup is in communicationin with the passage during OFF; the detecting mechanism includes a detecting component, the detecting component includes a shielding cover, and a sensing electrode is disposed in the shielding cover; the manufacturing device includes a processor, the processor is coupled to the detecting component, the processor includes an oscillating circuit, a frequency voltage converter, a signal processing circuit, and an on-off output circuit, and the oscillating circuit, the frequency voltage converter, the signal processing circuit, and the on-off output circuit are coupled to each other; the manufacturing device includes a display device, and the display device is coupled to the on off output circuit; the detecting mechanism incl des a sensor, and the sensor includes a color difference sensor; the detecting mechanism includes a proximity switch, and the proximity switch is a capacitive proximity switch.

According to the present application, due to the arrangement of the detecting mechanism, the phenomenon of bonding which occurs during the manufacturing process of the display panel, namely the bonding of the substrate of the display panel, can be effectively detected, thereby effectively preventing the substrate from dropping and breaking in the transfer process. The manufacturing efficiency of the display panel is effectively the scrap rate of the display panel is reduced, and the production cost is further saved, thereby greatly improving the market competitiveness of the display panel. When the manufacturing device grabs the spacer plate, under the normal condition, the spacer plate will generate the deformation of small amplitude due to the action force of the transfer mechanism and the gravity itself. When the substrate is bonded, the spacer plate is supported by the substrate below, and thus does not generate large deformation, so that the deformation of the spacer plate can be effectively detected by the detecting mechanism, thereby judging whether the condition that the substrate is bonded occurs or not. The bonding condition can be very accurately judged and can be processed in time to effectively prevent the substrate from dropping and breaking in the transfer process. The control mechanism can effectively control the transfer mechanism and the detecting mechanism to ensure stable and orderly operation of the manufacturing device, thereby effectively improving the working efficiency of the manufacturing device, and effectively improving the manufacturing efficiency of the display panel. The set height of the detecting mechanism is smaller than that of the transfer mechanism, so that the detecting mechanism can effectively perform the detection. Therefore, the accuracy of the detection is effectively ensured. The interference caused by the too small distance between the detecting mechanism and the measured object is effectively avoided, and the working precision of the detecting mechanism is further improved. In addition, the transfer mechanism can effectively protect the detecting mechanism, thereby effectively avoiding the damage to the detecting mechanism caused by the contact between the detected object and the detecting mechanism.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
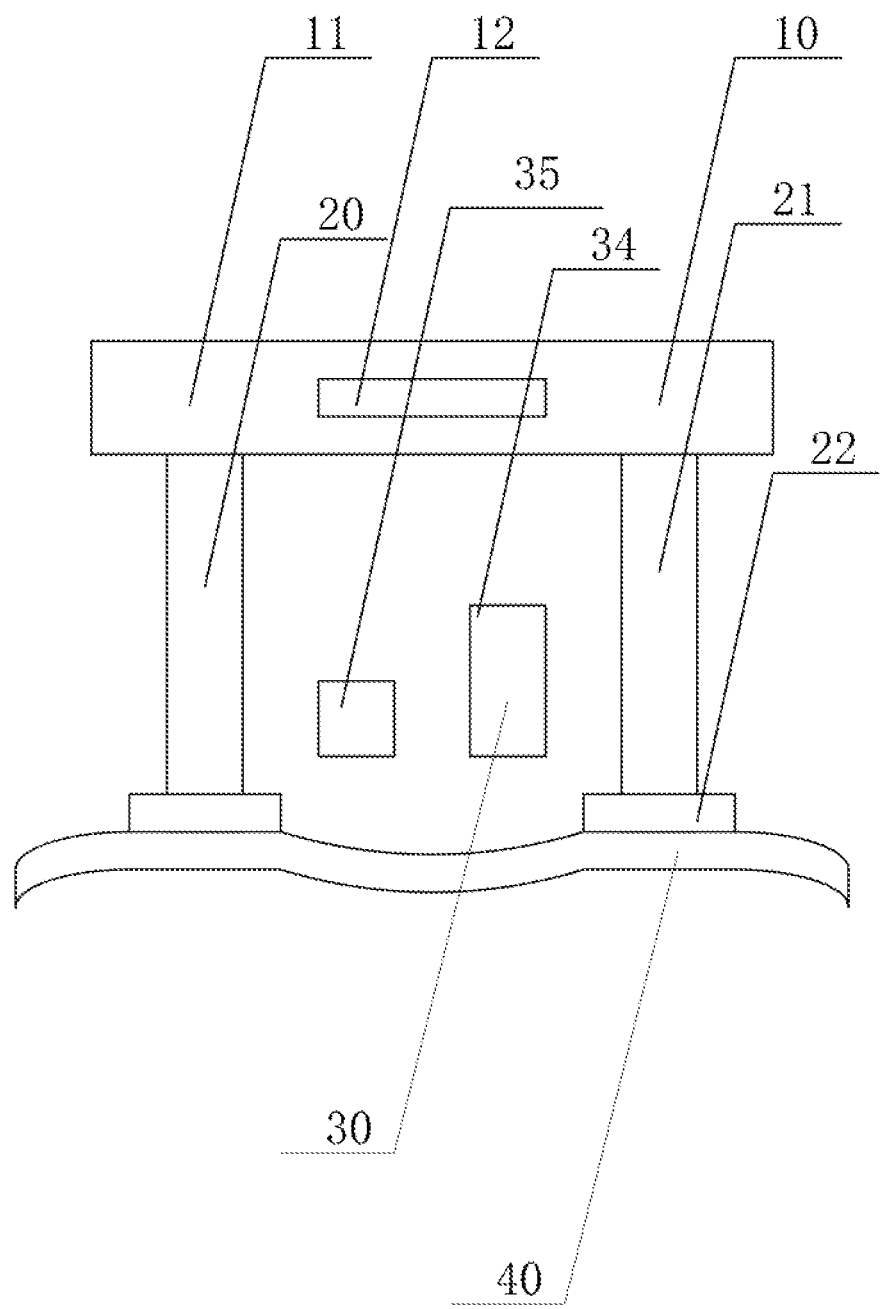
FIG. 1 is a schematic structural view of a manufacturing device for a display panel according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms "first". "second" are merely for a descriptive purpose, and cannot to be understood to indicate or imply a relative importance, or implicitly indicate the number of the indicated technical features. Hence, the features defined by "first", "second" can explicitly or implicitly include one or more of the features. In the description of the present application. "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood for those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, mechanisms and/or components, but do not preclude the presence or addition of one or more other features, integers, steps, operations, mechanisms, components and/or combinations thereof.

In the drawings, the structurally similar elements are denoted with the same reference signs.

Figure 2:
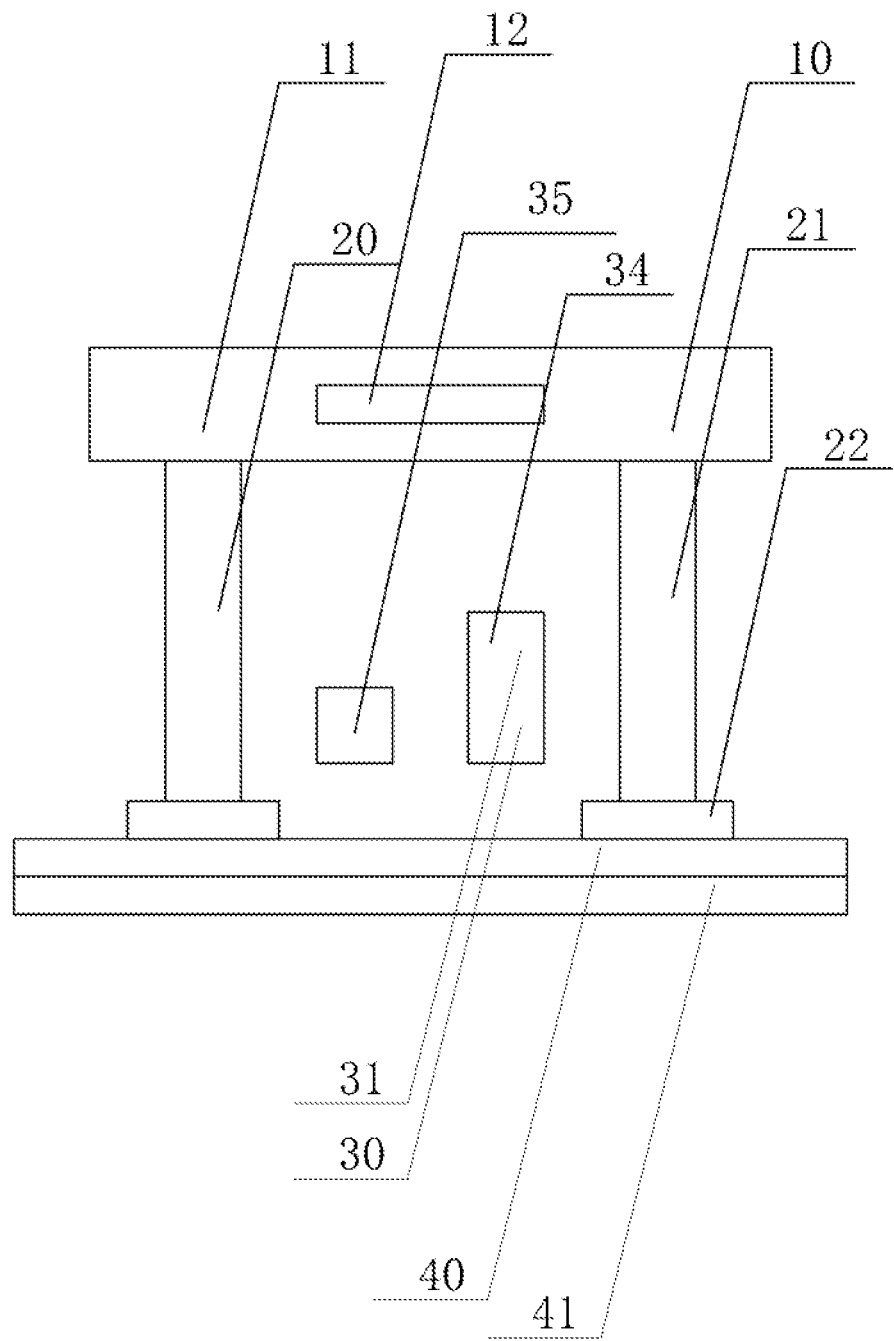
FIG. 2 is a schematic structural view of a manufacturing device for a display panel according to an embodiment of the present application.
Figure 3:
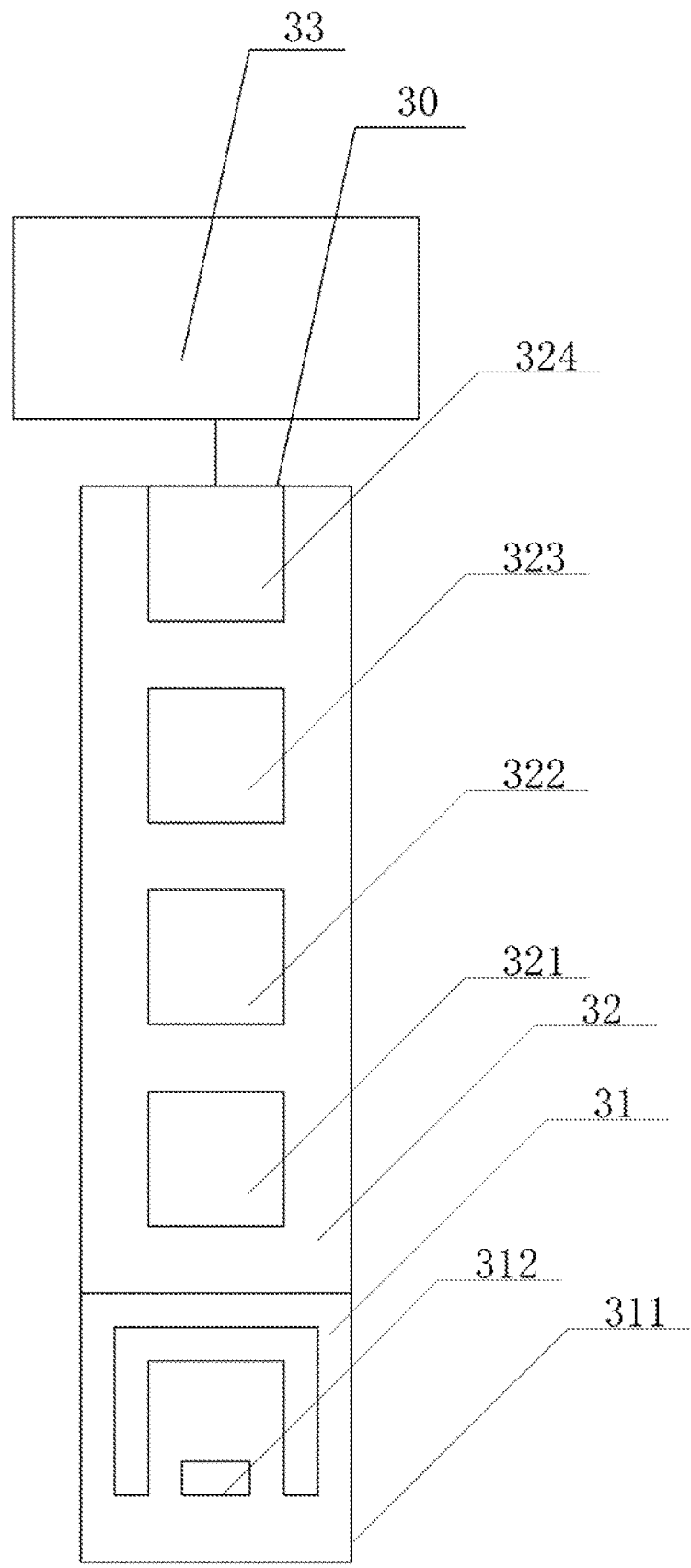
FIG. 3 is a schematic structural view of a detecting mechanism according to an embodiment of the present application

The manufacturing device for a display panel of the present application will be described in further detail below with reference to the embodiments of FIGS. 1 to 3.

The manufacturing device for a display panel includes:

a base 10;

at least one transfer mechanism 20, fixedly disposed on the base 1; and at least one detecting mechanism 30, fixedly disposed on the base 10;

a control mechanism 11 is disposed in the base 10, and the control mechanism 11 controls the transfer mechanism 20 and the detecting mechanism 30, where a set height of the detecting mechanism 30 is smaller than that of the transfer structure mechanism.

By the arrangement of the detecting mechanism 30, the phenomenon of bonding which occurs dining the manufacturing process of the display panel, namely the bonding of the substrate 41 of the display panel, can be effectively detected, thereby effectively preventing the substrate 41 from dropping and breaking in the transfer process. The manufacturing efficiency of the display panel is effectively improved, the scrap rate of the display panel is reduced, and the production cost is further reduced, thereby greatly improving the market competitiveness of the display panel. When the manufacturing device grabs the spacer plate 40, under the normal condition, the spacer plate 40 will generate the deformation of small amplitude due to the action force of the transfer mechanism 20 and the gravity itself. When the substrate 41 is bonded, the spacer plate 40 is supported by the substrate 41 below, and thus does not generate large deformation, so that the deformation of the spacer plate 40 can be effectively detected by the detecting mechanism 30, thereby judging whether the condition that the substrate 41 is bonded occurs or not. The bonding condition can be very accurately judged, and can be processed in time to effectively prevent the substrate 41 from dropping and breaking in the transfer process. The control mechanism 11 can effectively control the transfer mechanism 20 and the detecting mechanism 30 to ensure stable and orderly operation of the manufacturing device, thereby effectively improving the working efficiency of the manufacturing device, and effectively improving the manufacturing efficiency of the display panel. The set height of the detecting mechanism 30 is smaller than that of the transfer mechanism, so that the detecting mechanism 30 can effectively perform the detection. Therefore, the accuracy of the detection is effectively ensured. The interference caused by the too small distance between the detecting mechanism 30 and the measured object is effectively avoided, and the working precision of the detecting mechanism 30 is further improved. In addition, the transfer mechanism 20 can effectively protect the detecting mechanism, thereby effectively avoiding the damage to the detecting mechanism 30 caused by the contact between the detected object and the detecting mechanism 30.

The transfer mechanism 20 includes a support rod 21, one end of the support rod 21 is fixedly connected to the base 10, and the other end of the support rod 21 is provided with a suction cup 22. By the arrangement of the support rod 21, manufactured components can be effectively transferred in the manufacturing process of the display panel, and the manufacturing of the display panel can be better finished. The components of the display panel which need to be transferred can be effectively sucked by the suction cup 22. The suction cup 22 is made of a flexible material, thus the suction cup can be better attached to the components of the display panel which need to be transferred, and the air in the suction cup 22 can be effectively removed. Therefore, a greater action force can be obtained, and the components of the display panel which need to be transferred can be effectively prevented from dropping and breaking in the transfer process. At least two support rods 21 are disposed to better finish the supporting and transfer work. A rotating mechanism is disposed at one end of the support rod 21 fixedly connected to the base 10, and the rotating work can be finished by the rotating mechanism, thereby better finishing the transfer and alignment work of the components of the display panel, and effectively improving the manufacturing efficiency of the display panel.

The support rod 21 is provided with a passage therein, one end of the passage provided with the suction cup 22 is provided with a switch, the control mechanism 11 controls the ON or OFF of the switch, and the suction cup 22 is in communication with the passage during OFF. The On and OFF of the switch are controlled by the control mechanism 11, the switch is OFF when the suction cup 22 needs to be vacuumized, such that air is pumped from the passage, and the suction cup 22 obtains a larger suction force, thereby effectively preventing the components of the display panel from dropping and breaking in the transfer process. The switch is controlled to be ON after the air in the suction cup 22 is completely pumped, and a vacuum state in the suction cup 22 is ensured.

The detecting mechanism 30 includes a detecting component 31, the detecting component 31 includes a shielding cover 311, and a sensing electrode 312 is disposed in the shielding cover 311. Due to the arrangement of the shielding cover 311, the interference of electromagnetism on the detecting component 31 can be effectively avoided, such that the detection efficiency of the detecting component 31 is further improved, and the precision of the detecting component 31 is effectively improved.

The manufacturing device 31 includes a processor 32, the module processor 32 is coupled to the detecting component 31, the process 32 includes an oscillating circuit 321, a frequency voltage converter 322, a signal processing circuit 323, and an on-off output circuit 324, and the oscillating circuit 321, the frequency voltage converter, signal processing circuit 323, and on off output circuit 324 are coupled to each other. when approaching an effective surface of the sensor, an object enters an electric field in front of the surface of the detecting component 31 and causes the coupling capacitance to be changed. An oscillator in the oscillating circuit 321 begins to oscillate, the amplitude of oscillation is converted into a voltage model by the frequency voltage converter 322, and the voltage model is processed by the signal processing circuit 323 and the on-off output circuit 324 to output a switch command.

The manufacturing device 31 includes a display device 33, the display device 33 is coupled to the on-off output uit 324. In this way, the display device 33 is configured to display the switch command output by the on off output circuit 324 on-off output circuit, and the display device 33 is optionally a display screen, a sound signal output circuit, a light signal output circuit, etc.

The detecting mechanism 30 includes a sensor, and the sensor includes a color difference sensor 35. The color difference sensor 35 is a simple color deviation tester, that is, a light filter having the simulated spectral characteristics equivalent to the color sensitivity of human eyes is manufactured, and is used for preforming photometry on a sample plate. The key is to design the spectral sensitivity characteristics of such photoreceptor, and to measure and display a color difference value via computer software under a certain light source. The color difference sensor 35 is used in the use process to distinguish the spacer plate 40 and the substrate 41, the bonding phenomenon occurring in the manufacturing process of the display panel is comprehensively judged and detected in cooperation with sensors of other forms, and the sensors of other forms optionally include a distance sensor, a photosensitive sensor, a pressure sensor and the like.

The detecting mechanism 30 includes a proximity switch. The proximity switch is a position switch which can be operated without mechanical direct contact with moving components. When the object approaches the sensing surface of the switch for an actuating distance, the switch can be actuated without mechanical contact and the application of any pressure, thereby driving a DC electric appliance or providing a control command for a computer (plc) device. The proximity switch is a switch type sensor (i.e., a contactless switch), which has the characteristics of a travel switch and a micro switch, has the sensing performance, is reliable in operation and stable in performance, fast in frequency response, long in application life, strong in anti-interference capacity, and has waterproof, shockproof and corrosion-resistant characteristics, etc. The proximity switch is a capacitive proximity switch 34. The capacitive proximity switch 34 is a position sensor having on-off output. A measuring head is a polar plate forming a capacitor, while the other polar plate is the object itself. When the object approaches the proximity switch, the dielectric constants of the object and the proximity switch change, so that the circuit state connected to the measuring head also changes accordingly, thereby controlling the ON OFF of the proximity switch. The object detected by the proximity switch is not limited to a conductor, and may be insulating liquid or powder, etc. The sensing surface of the capacitive sensor is composed of two concentrically arranged metal electrodes 312, which are equivalent to the electrodes 312 of a non-wire winding capacitor. Surfaces a and b of the electrode 312 are connected to a feedback branch of a high frequency oscillator, and the oscillator is adjusted in order that the oscillator does not oscillate when being free on the surfaces. When approaching an effective surface of the sensor, the object enters the electric field in front of the surface of the electrode 312 and causes the coupling capacitance to be changed. The oscillator begins to oscillate, and the amplitude of oscillation is recorded by an evaluation circuit and converted into a switch command.

The control mechanism 11 includes a chip unit 12, and the chip unit 12 is coupled to the detecting mechanism 30 and the transfer mechanism 20. The chip unit 12 can effectively control the detecting mechanism 30 and the transfer mechanism 20 to ensure stable and orderly operation of the manufacturing device, thereby effectively improving the working efficiency of the manufacturing device, and effectively improving the manufacturing efficiency of the display panel.

In the above embodiment, the material of the substrate may be glass, a plastic light-transmitting material or the like.

In the above embodiment, by taking the liquid crystal panel as an example, the liquid crystal panel includes an array substrate and a color filter (CF) substrate, the array substrate is disposed opposite to the color filter substrate, and liquid crystal and a spacing mechanism are disposed between the array substrate and the color filter substrate. The array substrate is provided with an active switch. The active switch is, for example, a thin film transistor (TFT). The color filter substrate is provided with a color photoresist layer, and the color photoresist layer and the active switch may be formed on the same substrate.

In the above embodiment, the display panel includes a liquid crystal panel, an organic light-emitting diode (OLED) panel, a quantum dot light emitting diode (QLED) panel, a plasma panel, a flat panel, a curved panel, and the like, which are not limited herein.

The foregoing is further detailed description of the present application in conjunction with the specific embodiments, and the specific implementation of the present application is not limited to the description. For a person skilled in the art, several simple derivations and substitutions may be made without departing from the conception of the present application, and should be within the protective scope of the present application.

What is claimed is:

1. A manufacturing device fir a display panel, comprising:
   a base:
   at least one transfer mechanism, fixedly disposed on the base: and.
   at least one detecting mechanism, fixedly disposed on the base;
   a control mechanism is disposed in the base, and the control mechanism controls the transfer mechanism and the detecting mechanism, wherein a set height of the detecting mechanism is smaller than that of the transfer mechanism; the transfer mechanism comprises a support rod, wherein one end of the support rod is fixedly connected to the base, and the other end of the support rod is provided with a suction cup; the support rod is provided with a passage therein, one end of the passage provided with the suction cup is provided with a switch, the control mechanism controls the ON or OFF of the switch, and the suction cup is in communication with the passage during OFF; the detecting mechanism comprises a detecting component, the detecting component comprises a shielding cover, and a sensing electrode is disposed in the shielding cover; the manufacturing device comprises processor, the processor is coupled to the detecting component, the processor comprises an oscillating circuit, a frequency voltage converter, a signal processing, circuit, and an on-off output circuit, and the oscillating circuit, the frequency voltage converter, the signal processing circuit, and the on off output circuit are coupled to each other; the manufacturing device comprises module display device, and the display device is coupled to the on-off output circuit; the detecting mechanism comprises a sensor, and the sensor comprises a color difference sensor; the detecting mechanism comprises a proximity switch, the proximity switch is a capacitive proximity switch, and a sensing surface of the capacitivecapacitite sensor is formed by two concentrically disposed metal electrodes.

2. A manufacturing device for a display panel, co prisnig;
a base;
at least one transfer mechansism, fixedly disposed on the base; and
at least one detecting mechanism, fixedly disposed on the base;
a control mechanism is disposed in the base, the control mechanism controls the transfer mechanism and the detecting mechanism, and a set height of the detecting mechanism is smaller than that of the transfer mechanism.

3. The manufacturing device for a display panel according to claim 2, wherein the transfer mechanism comprises a support rod, one end of the support rod is fixedly connected to the base, and the other end of the support rod is provided with a suction cup.

4. The manufacturing, device for a display panel according to claim 3, Wherein the support rod is provided with a passage therein, one end of the passage provided with the suction cup is provided with a switch, the control mechanism controls the ON or OFF of the switch, and the suction cup is in communication with the passage during OFF.

5. The manufacturing, device for a display panel according to claim 3, Wherein the suction cup is made of a flexible material.

6. The manufacturing device for a display panel according to claim 3, wherein one end of the support rod fixedly connected to the base is provided with a rotating mechanism.

7. The manufacturing device for a display panel according to claim 2, wherein the detecting mechanism comprises a detecting component. the detecting component comprises a shielding cover, and a sensing electrode is disposed in the shielding cover.

8. The manufacturing device for a display panel according to claim 7, wherein the manufacturing device comprises a processor, the processor is coupled to the detecting component, the processor comprises an oscillating circuit, a frequency voltage converter, signal processing circuit and an on-off output circuit, and the oscillating circuit, the frequency voltage converter, the signal processing circuit, and the on-off output circuit are coupled to each other.

9. The manufacturing device for a display ,panel according to claim 8, wherein the manufacturing device comprises a display device, and the display device is Coupled to the on-off output circuit.

10. The manufacturing device for a display panel according to claim 9, wherein the display device is a display screen.

11. The manufacturing device for a display panel according to claim 9, wherein the display device is a output circuit to output a sound signal.

12. The manufacturing device for a display panel according to claim 9, wherein the display device is a output circuit to output a light signal.

13. The manufacturing device for a display panel according to claim 2, wherein the detecting mechanism comprises a sensor.

14. The manufacturing device for a display panel according to claim 13, wherein the sensor comprises a color difference sensor.

15. The manufacturing device for a display panel according to claim 13, wherein the sensor comprises a distance sensor.

16. The manufacturing device for a display panel according to claim 13, Wherein the sensor comprises a photosensitive sensor.

17. The manufacturing device for a display panel according to claim 2, wherein the detecting mechanism comprises a proximity switch, and the proximity switch is a capacitive proximity switch.

18. The manufacturing device for a display panel according to claim 17, wherein a sensing surface of the capacitive sensor is formed by two concentrically disposed metal electrodes.

19. The manufacturing device for a display panel according to claim 2, wherein the control mechanism comprises a control chip, and the control chip is coupled to the detecting mechanism and the transfer mechanism.

20. The manufacturing device for a display panel according to claim 2, wherein at least two support rods are disposed.

* * * * *